United States Patent
Freund et al.

(10) Patent No.: US 9,259,991 B2
(45) Date of Patent: Feb. 16, 2016

(54) ELECTRIC HEATING DEVICE FOR VEHICLES HAVING A HIGH VOLTAGE ELECTRIC SYSTEM

(75) Inventors: Andreas Freund, Schalkau (DE); Hans-Joachim Lilge, Weitramsdorf (DE); Johannes Molitor, Ehningen (DE); Markus Hermann, Esslingen (DE); Marian Mazurek, Stuttgart (DE); Martin Aidam, Reutlingen (DE)

(73) Assignee: VALEO KLIMASYSTEME GMBH, Bad Rodach (DE)

( * ) Notice: Subject to any disclaimer, the term of this patent is extended or adjusted under 35 U.S.C. 154(b) by 469 days.

(21) Appl. No.: 13/519,946

(22) PCT Filed: Jan. 4, 2011

(86) PCT No.: PCT/EP2011/050067
§ 371 (c)(1),
(2), (4) Date: Feb. 13, 2013

(87) PCT Pub. No.: WO2011/083115
PCT Pub. Date: Jul. 14, 2011

(65) Prior Publication Data
US 2013/0134151 A1 May 30, 2013

(30) Foreign Application Priority Data

Jan. 5, 2010 (DE) .......................... 10 2010 004 034
Jan. 4, 2011 (WO) .................. PCT/EP2011/050067

(51) Int. Cl.
*H05B 3/02* (2006.01)
*B60H 1/22* (2006.01)
(Continued)

(52) U.S. Cl.
CPC ............ *B60H 1/2215* (2013.01); *F24H 3/0429* (2013.01); *F24H 3/0435* (2013.01); *F24H 3/0458* (2013.01); *H05B 3/50* (2013.01); *B60H 2001/2268* (2013.01); *H05B 2203/023* (2013.01)

(58) Field of Classification Search
CPC ............... B60H 1/2215; B60H 1/2225; B60H 2001/2268; H05B 3/50; H05B 3/48; H05B 3/46; H05B 2203/023; F24H 3/0458; F24H 3/0429; F24H 3/0435; F24H 3/04; F24H 3/0405
USPC ......... 219/539, 202, 530, 209, 540, 505, 520, 219/522, 523; 392/347, 354
See application file for complete search history.

(56) References Cited

U.S. PATENT DOCUMENTS 6,720,536 B2 * 4/2004 Bohlender .................... 219/504
6,810,203 B2 10/2004 Alban et al.
(Continued)

FOREIGN PATENT DOCUMENTS

DE 3042420 * 6/1982
DE 3042420 A1 6/1982
(Continued)

OTHER PUBLICATIONS

English language translation for DE 3042420 extracted from the espacenet.com database on Aug. 24, 2012, 22 pages.
(Continued)

Primary Examiner — Shawntina Fuqua
(74) Attorney, Agent, or Firm — Howard & Howard Attorneys PLLC

(57) ABSTRACT

In the heating device, PTC heating elements arranged between current rails lying opposite each other are used, which are fed with supply current from a control electronics unit via the current rails. Metallic heating rib structures are respectively coupled to one of the current rails via an electrically insulating but thermally conducting coupling layer. The air to be heated flows through the heating rib structures which have an undulating shape. The metallic heating rib structures are electrically connected to vehicle ground and thus form a shield that eliminates emissions of electromagnetic interfering radiation without impeding the flow of air.

9 Claims, 3 Drawing Sheets

(51) Int. Cl.
*H05B 3/50* (2006.01)
*F24H 3/04* (2006.01)

(56) References Cited

U.S. PATENT DOCUMENTS

| | | | |
|---|---|---|---|
| 6,875,962 B2 | 4/2005 | Uhl et al. | |
| 2003/0180033 A1* | 9/2003 | Alban et al. | 392/347 |
| 2008/0135536 A1 | 6/2008 | Kochems et al. | |

FOREIGN PATENT DOCUMENTS

| DE | 102006055872 B3 | 3/2008 |
|---|---|---|
| WO | WO 02/057100 A2 | 7/2002 |

OTHER PUBLICATIONS

English language abstract for DE 102006055872 extracted from the espacenet.com database on Aug. 24, 2012, 7 pages.
English language abstract for WO 02/057100 extracted from the espacenet.com database on Aug. 24, 2012, 32 pages.
International Search Report for Application No. PCT/EP2011/050067 dated Apr. 6, 2011, 3 pages.

* cited by examiner

US 9,259,991 B2

ELECTRIC HEATING DEVICE FOR VEHICLES HAVING A HIGH VOLTAGE ELECTRIC SYSTEM

RELATED APPLICATIONS

This application is the National Stage of International Patent Application No. PCT/EP2011/050067, filed on Jan. 4, 2011, which claims priority to and all the advantages of German Patent Application No. DE 10 2010 004 034.7, filed on Jan. 5, 2010.

FIELD OF THE INVENTION

The invention relates to an electric heating device for vehicles having a high voltage electric system.

BACKGROUND OF THE INVENTION

Vehicles with electric propulsion or hybrid propulsion, too, need a heating system for controlling the temperature of the vehicle cabin when outside temperatures are low. The heating energy comes from electric heating devices that are fed with electricity from the electric system of the vehicle. These heating devices are made up from a stack of identical heating units through which the air to be heated flows. In the heating device, PTC heating elements are used which are arranged between current rails that extend opposite each other, which means electric resistance elements having a positive temperature coefficient, which are fed with supply current from a control electronics unit. Metallic heating rib structures are respectively coupled to each of the current rails by means of an electrically insulating but thermally conducting coupling layer. The air to be heated flows through the heating rib structures, which have an undulating shape. The electric insulation of the heating rib structure from the current rails is necessary because the voltages taken from a high voltage electric system of the vehicle have high levels that are dangerous to humans. Consequently, in the known electrical heating devices of this type, the heating rib structures are potential-free.

However, in order to control the heating output, switched supply currents are fed to the PTC heating elements by the control electronics unit. The switching operations generate steep pulse edges which constitute a high frequency alternating current component of the supply current. As a result of these high frequency alternating current components, all live parts become radiators which in total emit a substantial amount of electromagnetic interfering radiation. Moreover, high frequency interference components from the on-board network of other vehicle units are already present in the supply currents for the PTC heating elements and can also be radiated via the live parts of the heating device. This interfering radiation can jeopardise the safe functioning of other systems in the vehicle as well as significantly affect receiving devices such as for example a radio.

In principle it is possible to surround the radiation-relevant parts of the heating device with an electromagnetic shield in the form of a metallic grid. However, since the grid will necessarily be located within the flow path of the air to be heated, it causes flow losses that would have to be compensated for by increasing the blower power.

SUMMARY OF THE INVENTION

It is therefore the object of the invention to enable an electromagnetic shield of the heating device to be obtained without the use of a surrounding metallic grid.

This is achieved in a surprisingly simple manner in a heating device of the type mentioned in the beginning by means of the fact that the metallic heating rib structures are electrically connected to a fixed reference potential, in particular vehicle ground. The term vehicle ground is to be understood to mean the reference potential of the electric system of the vehicle that is connected to the metallic structures of the vehicle in an electrically conducting manner, i.e. in general to the negative low-voltage (electric 12 V system) pole thereof. It will then be the metallic heating rib structures that will effect an electromagnetic shielding of the heating device, since they surround the radiation-relevant parts of the heating device on both sides of the PTC heating elements.

The control electronics unit, too, is a source of electromagnetic interfering radiation. In the preferred embodiment, therefore, the control electronics unit is surrounded by a housing that forms an electromagnetic shield and is also electrically connected to the fixed reference potential and/or vehicle ground. Since the control electronics unit will conveniently be arranged immediately next to the heating device, the housing of the control electronics unit is preferably directly connected to the metallic heating rib structure.

In a further development of the invention it is proposed to electromagnetically shield also the narrow sides of the layer structures of the heating device, which consist of PTC heating elements, current rails and coupling layers, by means of metallic shielding strips which are electrically connected to vehicle ground.

According to an advantageous embodiment, a further enhancement of the "density" of the electromagnetic shield is achieved by means of the fact that respectively one metallic shielding layer is arranged between the coupling layers and the heating rib structures, which shielding layer is electrically and thermally coupled thereto. Due to the fact that the metallic shielding strips form a continuous shielding structure with respectively two metallic shielding layers on each of the narrow sides, an electromagnetic encapsulation is achieved which is made even more complete due to the fact that the shielding layers form, in combination with the housing of the control electronics unit, a continuous and closed shielding structure, but in any case a continuous electric connection with the housing.

BRIEF DESCRIPTION OF THE DRAWINGS

Further features and advantages of the invention will become evident from the detailed description following below of several embodiments with reference to the attached drawings, wherein:

FIG. 2b shows a cross-sectional view along the line IIb-IIb in FIG. 2a;

FIG. 6b shows a cross-sectional view along the line VIb-VIb in FIG. 6a.

DETAILED DESCRIPTION OF THE INVENTION

Figure 1:
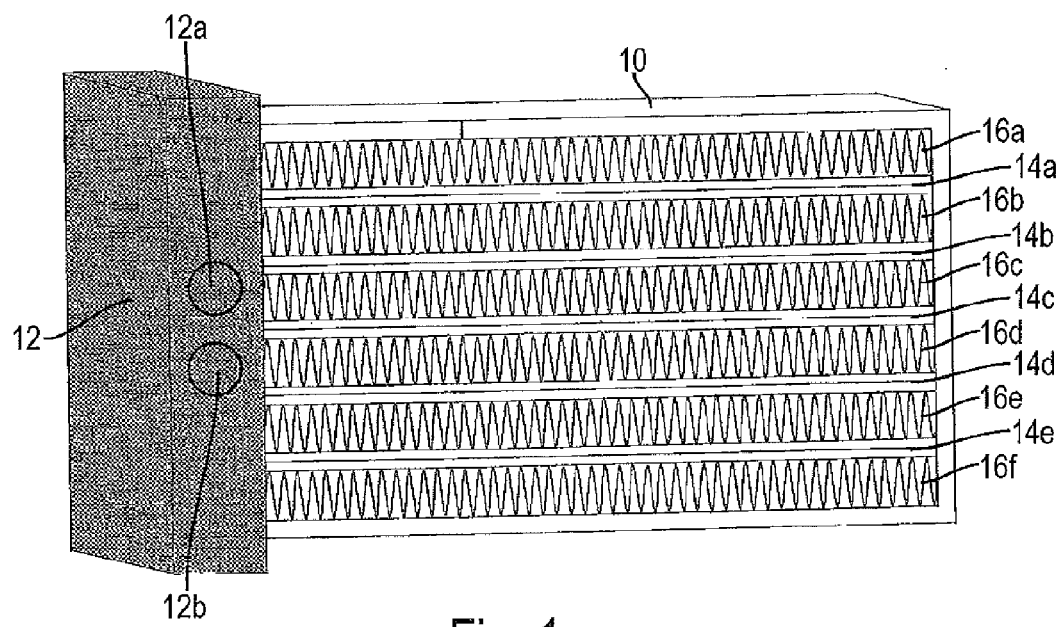
FIG. 1 shows a schematic perspective view of a first embodiment of an electric heating device.

In the various embodiments of the electric heating device, the same basic design having a rectangular frame 10 and a control block 12 is used, which is arranged on a lateral surface of the frame 10. Within the frame 10, a plurality of PTC heating elements, so-called "PTC stones", are arranged on current rails in several heating surfaces which are spaced apart from each other. FIG. 1 shows five such heating surfaces; they are referred to as 14a . . . 14e. On either side of the heating surfaces 14a . . . 14e, metallic undulating heating rib structures 16a . . . 16f are continuously arranged. Through these heating rib structures 16a . . . 16f, air to be heated flows. The control block 12 surrounds control electronics having an electric terminal 12a and a signal terminal 12b on the outside. The current rails on which the PTC stones are located extend into the control block 12, as can be seen from FIG. 2, and are connected therein to the control electronics.

Figure 2A:
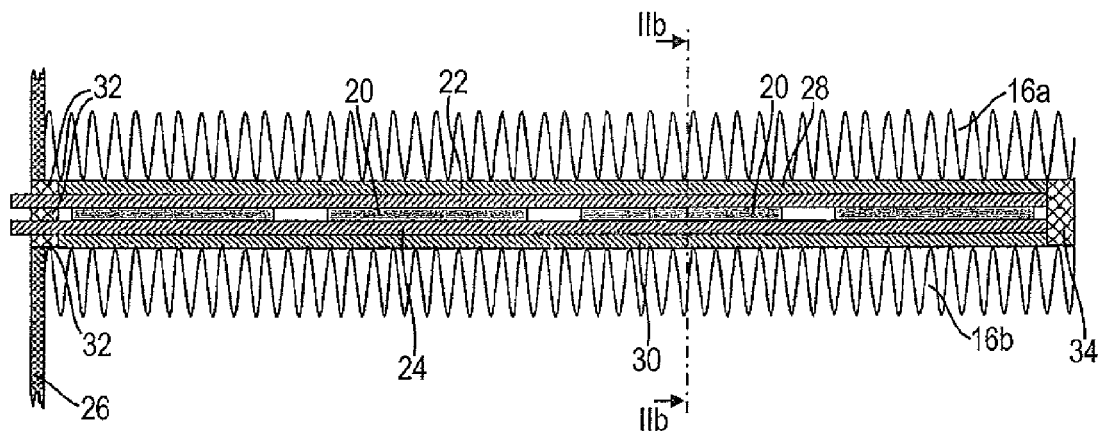
FIG. 2a shows a view of a longitudinal section of the first embodiment.
Figure 2B:
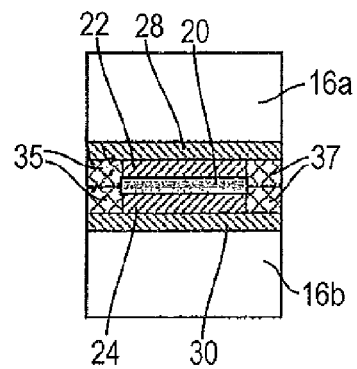

As shown in FIG. 2a, the flat PTC stones 20 lie, with a slight distance between them, next to each other between two current rails 22, 24 which may be formed as solid metal sheets. Each current rail 22, 24 is connected at one end that protrudes into the control block 12, of which only one housing wall 26 is shown in FIG. 2a, to a pole of the supply voltage applied by the control electronics unit. Since the PTC stones 20 are fed from a high voltage electric system of the vehicle, special electric insulation measures are needed. Therefore, insulating plates 28 and 30 are respectively placed on top of the outside of a current rail 22, 24 so as to electrically insulate the heating rib structures 16a, 16b arranged thereon. All of the narrow faces are also covered by electric insulating materials. In FIG. 2a, the ends of the current rails 22, 24, which protrude into the control block 12, are electrically insulated by insulating elements 32, and the opposite ends by an insulating strip 34.

In order to shield against electromagnetic interfering radiation, several measures have been taken. On the one hand, the housing wall 26 of the control block is made from solid metal sheets or is at least metallically coated and connected to vehicle ground. On the other hand, also the heating rib structures 16 are electrically connected to vehicle ground. A simple way of connecting the heating rib structures 16 to vehicle ground is to electrically connect the ends adjacent to the control block 12 to the shield thereof. As a result of the electromagnetic shield thus formed, any interfering radiation emerging from the flat sides of the PTC stones 20 as well as from the inside of the control block 12 is at least greatly reduced if not even eliminated.

Figure 3:
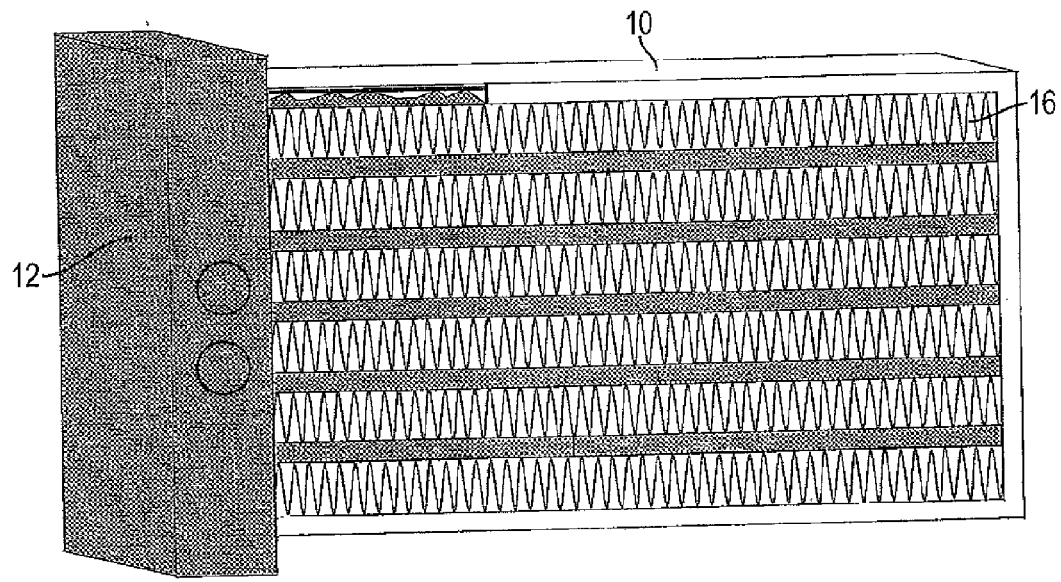
FIG. 3 shows a schematic perspective view of a second embodiment of an electric heating device.
Figure 4A:
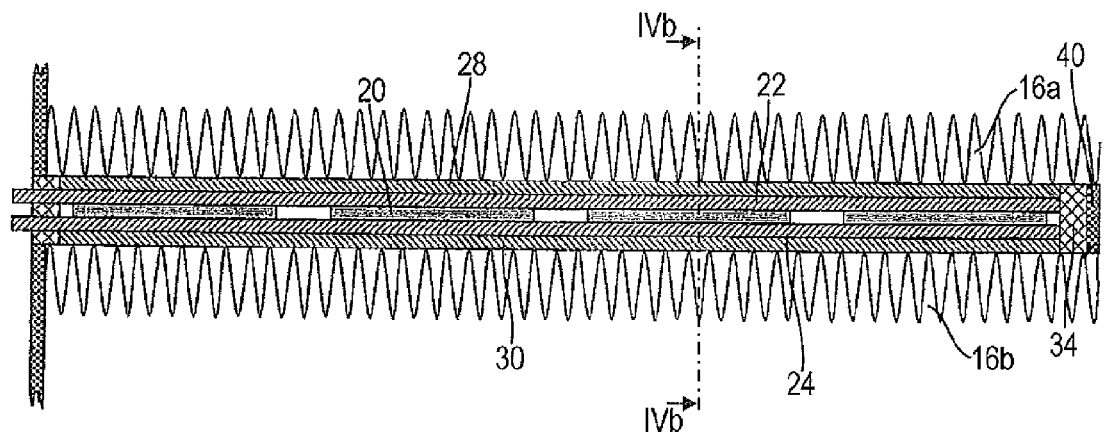
FIG. 4a shows a view of a longitudinal section of the second embodiment.
Figure 4B:
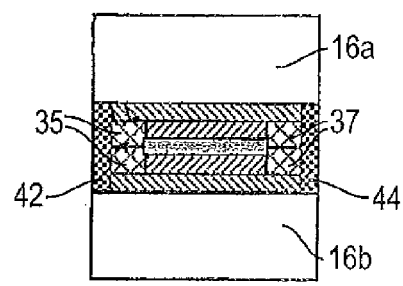
FIG. 4b shows a cross-sectional view along the line IVb-IVb in FIG. 4a of the second embodiment.

The embodiment shown in FIGS. 3 and 4 is a further embodiment aimed at designing the electromagnetic shielding to be even more effective. For this purpose, also the ends of the current rails 22, 24, which are covered with the insulating strip 34, are provided with a shield, here in the form of a metal strip that covers the insulating strip 34 on the outside, which metal strip is connected on its narrow sides to the heating rib structures 16a, 16b in an electrically conducting manner. In the same way, as shown in FIG. 4b, the lateral insulating strips 35 and 37 are covered on the outside by metal strips 42, 44 which are electrically connected to the heating rib structures 16a, 16b. Thus, the PTC stones are completely encapsulated on all sides and are electromagnetically shielded.

Figure 5:
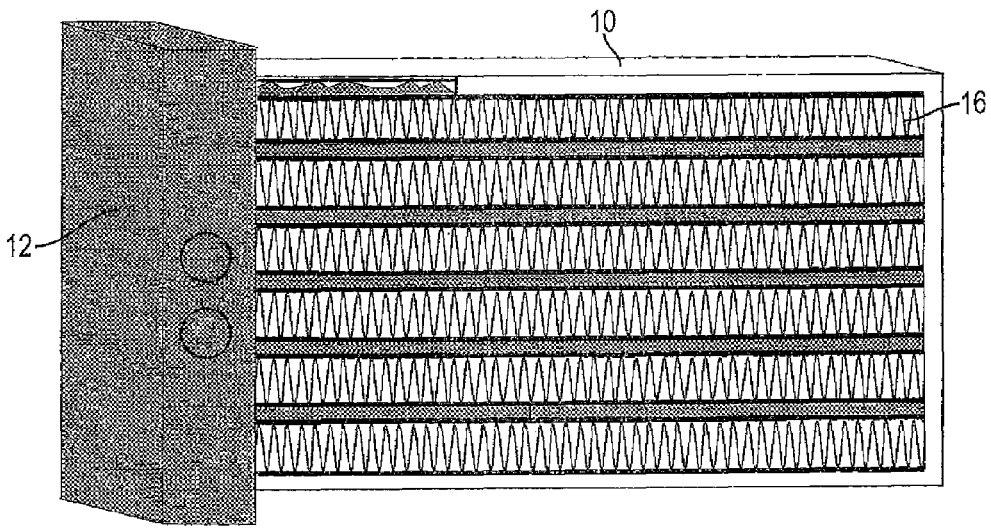
FIG. 5 shows a schematic perspective view of a third embodiment of an electric heating device.
Figure 6A:
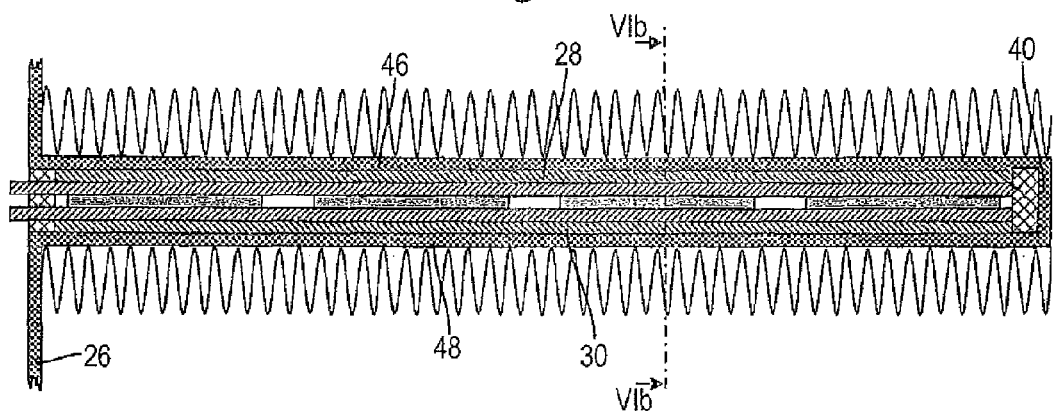
FIG. 6a shows a view of a longitudinal section of the third embodiment.
Figure 6B:
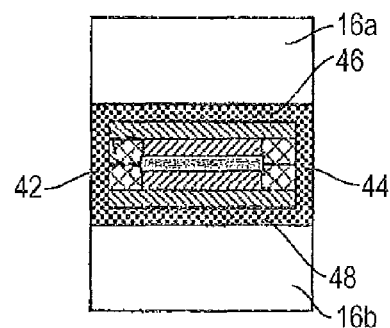

A further configuration level is shown in FIGS. 5 and 6. In this embodiment, the effectiveness of the electromagnetic shielding is enhanced even further. This is achieved by inserting respectively one metal plate 46 or 48 between the heating rib structures 16a, 16b and the adjacent coupling layers or insulating plates 28, 30. The metal plates 46, 48 are laterally connected to the metal strips 42, 44 or are integrally formed therewith, as well as with the housing wall 26 of the control block 12. In this embodiment, all of the electromagnetically radiating parts are encapsulated, whereby any emergence of interfering radiation is virtually completely eliminated.

The invention claimed is:

1. An electric heating device for vehicles having a high voltage electric system, said device including PTC heating elements that are arranged between current rails which are arranged opposite each other, which heating elements are fed with supply current from a control electronics unit via the current rails, and having metallic heating rib structures which are each coupled to one of the current rails via an electrically insulating but thermally conducting coupling layer, wherein the metallic heating rib structures are electrically connected to a fixed reference potential, and wherein narrow sides of the layer structures including the PTC heating elements, the current rails, and the coupling layers are covered with metallic shielding strips that are electrically connected to the fixed reference potential.

2. The heating device as claimed in claim 1, wherein the control electronics unit is surrounded by a housing that has an electric shield that is connected to the fixed reference potential.

3. The heating device as claimed in claim 2, wherein the heating rib structures are electrically coupled to the metallic shield of the housing.

4. The heating device as claimed in claim 1, wherein an electric insulation is inserted between the metallic shielding strips and the narrow sides of the current rails.

5. The heating device as claimed in claim 1, wherein between each of the coupling layers and the heating rib structures, respectively, one metallic shielding layer is arranged that is electrically and thermally coupled therewith.

6. The heating device as claimed in claim 1, wherein the metallic shielding strips form a continuous shielding structure with respectively two metallic shielding layers.

7. The heating device as claimed in claim 6, wherein the shielding layers form a continuous shielding structure with the housing of the control electronics unit.

8. The heating device as claimed in claim 1, wherein the fixed reference potential is vehicle ground.

9. An electric heating device for vehicles having a high voltage electric system, said device including PTC heating elements that are arranged between current rails which are arranged opposite each other, which heating elements are fed with supply current from a control electronics unit via the current rails, and having metallic heating rib structures which are each coupled to one of the current rails via an electrically insulating but thermally conducting coupling layer, wherein the metallic heating rib structures are electrically connected to a fixed reference potential, wherein the fixed reference potential is vehicle ground.

* * * * *